(12) United States Patent
Celis et al.

(10) Patent No.: US 10,898,396 B2
(45) Date of Patent: Jan. 26, 2021

(54) LOADING SYSTEM

(71) Applicant: FORD GLOBAL TECHNOLOGIES, LLC, Dearborn, MI (US)

(72) Inventors: Robin Celis, Brabant (BE); Berten De Wael, Hombeek (BE); Nico Keyken, Limburg (BE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/191,001

(22) Filed: Nov. 14, 2018

(65) Prior Publication Data
US 2019/0142659 A1 May 16, 2019

(30) Foreign Application Priority Data

Nov. 14, 2017 (DE) .......................... 10 2017 220 200

(51) Int. Cl.
*A61G 3/08* (2006.01)
*A61G 3/02* (2006.01)
(Continued)

(52) U.S. Cl.
CPC .......... *A61G 3/0808* (2013.01); *A61G 3/0209* (2013.01); *A61G 3/062* (2013.01); *B60P 3/00* (2013.01); *Y10S 414/134* (2013.01)

(58) Field of Classification Search
CPC ...... A61G 5/104; A61G 3/062; A61G 3/0808; A61G 3/0209; A61G 7/1017; B60N 2/245; Y10S 414/134; B60R 9/0426
(Continued)

(56) References Cited

U.S. PATENT DOCUMENTS 3,297,182 A * 1/1967 Barry .................... B60P 1/6454
414/424
4,170,368 A * 10/1979 Southward ............... A61G 5/00
280/250.1
(Continued)

FOREIGN PATENT DOCUMENTS

DE 9409079 U1 9/1994
DE 69835019 T2 11/2006
GB 2285033 A 6/1995

OTHER PUBLICATIONS

Ford eChair, published Nov. 3, 2016, retrieved from https://www.youtube.com/watch?v=KPUnNYOPAhU on Jun. 12, 2019.

*Primary Examiner* — Gregory W Adams
(74) *Attorney, Agent, or Firm* — Brandon Hicks; Brooks Kushman

(57) ABSTRACT

A loading system for loading a wheelchair into a rear loading space of a vehicle includes at least one loading device disposable on the vehicle. The loading system has at least one first coupling unit disposable on a rear side of a backrest of the wheelchair and fixable to the wheelchair. The loading device has at least one second coupling unit capable of being coupled to the first coupling unit, at least one telescopic loading arm which at an end portion is connected to the coupling unit pivotable about a free pivot axis, and at least one pivot bearing fastenable to a front side end portion of the loading space, by which a pivot bearing the loading arm at another end portion is connected pivotable about a locationally-fixed pivot axis that runs parallel with and spaced apart from the free pivot axis transverse to a vehicle longitudinal direction.

14 Claims, 7 Drawing Sheets

(51) Int. Cl.
*B60P 3/00* (2006.01)
*A61G 3/06* (2006.01)

(58) Field of Classification Search
USPC .............. 414/462, 546, 921, 728; 403/3
See application file for complete search history.

(56) References Cited

U.S. PATENT DOCUMENTS

| | | | | |
|---|---|---|---|---|
| 4,185,280 A * | 1/1980 | Wilhelm | ............... | B66C 23/905 |
| | | | | 212/278 |
| 4,565,482 A | 1/1986 | Baker | | |
| 4,573,854 A | 3/1986 | McFarland | | |
| 4,813,088 A * | 3/1989 | DiMatteo | ............... | A61G 5/104 |
| | | | | 5/81.1 C |
| 5,413,366 A * | 5/1995 | Gibbons | ............... | B60D 1/46 |
| | | | | 280/490.1 |
| 5,611,638 A * | 3/1997 | Dorr | ............... | A61G 7/1019 |
| | | | | 403/321 |
| 5,651,657 A * | 7/1997 | Poindexter | ............... | B60P 1/00 |
| | | | | 187/222 |
| 5,746,563 A | 5/1998 | Steckler | | |
| 6,565,307 B1 * | 5/2003 | Niemela | ............... | B60P 1/6472 |
| | | | | 212/264 |
| 6,575,488 B2 * | 6/2003 | Massey | ............... | B60D 1/46 |
| | | | | 280/490.1 |
| 7,293,952 B2 * | 11/2007 | Park | ............... | A61G 3/06 |
| | | | | 414/542 |
| 7,296,960 B2 * | 11/2007 | Strong | ............... | A01M 31/02 |
| | | | | 414/546 |
| 7,306,421 B2 * | 12/2007 | Wolfe | ............... | B60P 1/4442 |
| | | | | 414/540 |
| 7,374,390 B2 * | 5/2008 | Strong | ............... | A01M 31/02 |
| | | | | 414/546 |
| 7,510,345 B2 * | 3/2009 | Kosh | ............... | A44B 11/2592 |
| | | | | 292/197 |
| 7,816,888 B2 * | 10/2010 | Rejman | ............... | B25F 5/02 |
| | | | | 320/114 |
| 8,073,598 B2 * | 12/2011 | Shimoda | ............... | B60N 2/245 |
| | | | | 701/1 |
| 8,956,102 B2 * | 2/2015 | Alasfour | ............... | B60P 1/4457 |
| | | | | 104/45 |
| 10,189,419 B2 * | 1/2019 | Billard | ............... | B62B 5/0003 |
| 2005/0214104 A1 | 9/2005 | Strong | | |
| 2013/0142604 A1 | 6/2013 | Esparza | | |
| 2016/0023586 A1 | 1/2016 | Potticary et al. | | |

* cited by examiner

LOADING SYSTEM

CROSS-REFERENCE TO RELATED APPLICATIONS

This application claims foreign priority benefits under 35 U.S.C. § 119(a)-(d) to DE Application 10 2017 220 200.9 filed Nov. 14, 2017, which is hereby incorporated by reference in its entirety.

TECHNICAL FIELD

The disclosure relates to a loading system for loading a wheelchair, preferably an electric wheelchair, into a rear loading space of a motor vehicle and for loading the wheelchair from the loading space, having at least one loading device that is disposable on the motor vehicle.

BACKGROUND

A wheelchair hereunder is referred to as an electric wheelchair, this not being intended to imply any limitation to an electric wheelchair. Loading an electric wheelchair into a motor vehicle is a problem for people with limited mobility who would like to drive the motor vehicle themselves. Either the electric wheelchair has to be manually disassembled by a person sitting in a driver's seat, whereafter the individual and potentially soiled components of the electric wheelchair have to be lifted and disposed on the passenger's seat of the motor vehicle, this being associated with a high effort in terms of time and effort. Alternatively, a cost-intensive mechanical system can be installed in or on the motor vehicle, respectively, said mechanical system potentially having a mechanical arm, for example, which requires much time in order to extend from the rear of the motor vehicle toward the front or the front side, respectively, to there acquire the electric wheelchair, then to move the electric wheelchair to the rear of the motor vehicle, and finally to lift the electric wheelchair into the rear loading space of the motor vehicle.

The video available from the link: https://www.youtube.com/watch?v=KPUnNYOPAhU shows an automated handling of an electric wheelchair. The automation comprises an autonomous driving function of an electric wheelchair, on account of which the electric wheelchair can drive autonomously from a driver's door region of the motor vehicle to the rear of the motor vehicle, and vice versa. The automation moreover comprises an autonomous loading and unloading function of a loading device that is disposed on the motor vehicle or in a rear loading space, respectively, by way of which the electric wheelchair that is positioned on a liftable platform of the loading device to the rear of the motor vehicle can be lifted into the loading space of the motor vehicle and can be lifted out of the loading space.

The limitations in the design of the autonomous loading and unloading function, or of a loading device that is equipped with such a function, respectively, are that no structural modifications of a motor vehicle floor or the like such as, for example, a modification of a tailgate mechanism, a modification of a motor vehicle floor, and the like should be necessary on the motor vehicle, and that all equipment components that are required for the loading and unloading function, or for the loading device, respectively, should be defined as accessories which can be readily disposed on the motor vehicle and can potentially be later removed again from the motor vehicle without damage to the motor vehicle. It is moreover recommended that the equipment components that are required for the loading and unloading function, or for the loading device, respectively, are provided as optional equipment components of a motor vehicle available to order such that the costs and the complexity of the motor vehicle can be minimized. For example, the opening of a tailgate by way of an actuator should be based on an item of vehicle equipment that is present and not based on a new design.

U.S. Pat. No. 4,573,854 A relates to a device for loading a foldable wheelchair into a rear loading space of a motor vehicle. The device comprises a coupling unit for coupling the device to wheels of the wheelchair on one side of the wheelchair. The loading device moreover comprises a pivoting mechanism which in a linear guide is guided so as to be displaceable in the longitudinal direction of the vehicle and by way of which the coupling unit can be pivoted from a vertical coupling position, lying outside the motor vehicle, to a horizontal loading position, disposed within the loading space, and vice versa.

U.S. Pat. No. 5,746,563 A relates to an automobile having a trunk compartment and a mechanical and electrical equipment which is fixedly installed in said compartment. The equipment comprises a means for holding an object, and a system of levers which has a pair of levers that are connected in an articulated manner for moving the object along a predetermined path and for carrying the object. The system of levers comprises at least one telescopic or extendable, respectively, lever. The means for holding an object is a gripping or supporting means for holding a wheelchair in a rigid or inflexible, respectively, manner. The system of levers is suitable for conveying the wheelchair by way of the gripping or supporting means from out of the trunk compartment, outside the car, to a front door of the car, or for coupling the supporting means to a rail which is provided on the external side of the car and leads to a front door of said car, wherein the supporting means is provided with ground casters and with a motor for moving along the rail. The system of levers and the supporting or gripping means for automatically moving the wheelchair along said predetermined path from the trunk compartment to the front door of the car, are controllable or steerable, respectively, from the dashboard of the car.

US 2016/0023586 A1 relates to a lifting arrangement for a vehicle, having a mounting which is conceived for being fastened to the vehicle, a lifting arm which is rotatably coupled to the mounting, and a docking structure which is supported by the lifting arm and is conceived for lifting a personal mobility means, wherein the docking structure includes an electrical connector for the electrical connection to an electrical connector of the personal mobility means.

GB 2 285 033 A relates to a rear lift for a vehicle, for example a van. The rear lift comprises side frames having a parallelogram connection which is formed by pairs of members which are connected to U-shaped arms which support a platform. The arrangement is such that the platform is lifted and moved into the vehicle in order to enable a load located on the platform to be forced further into the vehicle. The members are interconnected by a torsionally rigid transverse element.

DE 94 09 079 U1 relates to an automatic loader for a motor vehicle. The automatic loader comprises a receptacle table which is connectable to a lateral wheel of a foldable wheelchair. The automatic loader is configured in such a manner that the wheelchair fastened to the receptacle table during the linear conveyance, or additionally thereto, is also imparted rotation or tilting.

US 2013/0142604 A1 relates to a device for loading a wheelchair into a vehicle, and for automatically mounting the wheelchair in a housing which protects the wheelchair and the mechanisms of the device from the influence of weather during transportation. The device is used for automatically loading the wheelchair into the housing and mounting said wheelchair in said housing. The device comprises a wheelchair lifting gear, a weather-resistant housing, and a control module which can be operated by remote control.

SUMMARY

The disclosure is based on the object of providing a loading system for a motor vehicle that can be implemented in a simple manner in terms of construction and in a cost-effective manner.

The object is achieved according to the disclosure by a loading system, said loading system having at least one first coupling unit that is disposable on a rear side of a backrest of the wheelchair and is fixable to the electric wheelchair, wherein the loading device has at least one second coupling unit that is capable of being coupled to the first coupling unit, at least one telescopic loading arm which by way of an end portion is connected to the second coupling unit so as to be pivotable about a free pivot axis, and at least one pivot bearing that is fastenable to a frontside end portion of the loading space, by way of which pivot bearing the loading arm by way of another end portion is connected so as to be pivotable about a locationally fixed pivot axis that runs so as to be parallel with and spaced apart from the free pivot axis and so as to be transverse to a longitudinal direction of the vehicle.

It is to be pointed out that the features and measures set forth individually in the following description may be combined with one another in any desired technically meaningful way and disclose further configurations of the disclosure. The description, in particular in conjunction with the figures, characterizes and specifies the disclosure further.

The disclosure is preferably combined with an autonomous driving function of the electric wheelchair, by way of which the electric wheelchair can drive autonomously around the motor vehicle, potentially by way of additional availing of a function, for example a perimeter monitoring function, of the motor vehicle. On account thereof, the electric wheelchair upon a person alighting therefrom can drive from a driver's door region of the motor vehicle to the rear of the motor vehicle to a loading position in which the loading device according to the disclosure can be mechanically coupled to the first coupling unit that is fixed to the electric wheelchair, so as to load the electric wheelchair into the rear loading space. In the loading position, a rear side of the electric wheelchair preferably faces the rear of the motor vehicle. On account of the autonomous driving function, the electric wheelchair that is unloaded from the rear loading space can moreover drive autonomously from the loading position of said electric wheelchair, disposed behind the rear of the motor vehicle, to the driver's door region, or to a seating position beside the motor vehicle, respectively, in which seating position a person sitting on the driver's seat of the motor vehicle can take a seat on the electric wheelchair. The loading of the electric wheelchair into the rear loading space in the context of the application is at times also referred to as loading in or stowing. The loading of the electric wheelchair from the rear loading space in the context of the application is at times also referred to as unloading or discharging.

When a person with limited mobility has moved from the electric wheelchair to the driver's seat, said person can manually, or else by voice control, for example, activate the autonomous driving function of the electric wheelchair, for example directly on the electric wheelchair or by way of a remote control which can be formed, for example, by the motor vehicle or by a smart phone, such that the electric wheelchair drives in an autonomous manner to the rear loading position. An autonomous loading procedure by way of the loading device according to the disclosure can subsequently be carried out, on account of which the electric wheelchair is loaded into the rear loading space of the motor vehicle.

In order for the electric wheelchair to be loaded from the loading position thereof that is disposed to the rear of the motor vehicle into the rear loading space of the motor vehicle, a tailgate of the motor vehicle which in a closed position closes a rear loading space opening of the loading space, and in an open position releases the loading space opening, is initially automatically moved to the open position thereof. This can be performed during an autonomous driving operation of the electric wheelchair, or after the electric wheelchair has reached the loading position.

The telescopic loading arm which, for example, bears on a loading space floor of the rear loading space, can subsequently be deployed toward the rear, on account of which the second coupling unit of the loading device, connected to the loading arm so as to be pivotable about the free pivot axis, is moved toward the rear out of the loading space and to the electric wheelchair, or to the first coupling unit disposed on said electric wheelchair, respectively, until the two coupling units are in mutual contact. A final alignment of the electric wheelchair relative to the motor vehicle can still be performed herein, for example by way of physical contact between the coupling units. The coupling units thererafter are mechanically coupled to one another, on account of which the electric wheelchair is coupled to the loading device.

The second coupling unit is then tilted in the direction of the rear loading space, on account of which the electric wheelchair is lifted and, on account thereof, is supported by the loading device. The loading arm is retracted simultaneously, in a temporally overlapping manner, or thereafter. The rear wheels of the electric wheelchair which at the rear side of the electric wheelchair protrude beyond the backrest herein at the rear come into physical contact with a vehicle portion that on the floor adjoins to the loading space opening, on account of which the electric wheelchair is lifted further until the rear wheels are located on the loading space floor and in the direction of the front roll across said floor until the electric wheelchair has reached the transportation position thereof within the loading space, the electric wheelchair in said transportation position being disposed completely within the loading space. On account of this physical contact between the rear wheels of the electric wheelchair and the motor vehicle, and of the lifting of the electric wheelchair associated therewith, the loading arm is pivoted upward about the locationally-fixed pivot axis, or away from the loading space floor, respectively. Lastly, the tailgate is automatically moved to the closed position thereof. The tailgate of the motor vehicle, upon manual and/or for example voice-controlled activation of an operating element on the motor vehicle or on a remote control, for example on a smart phone or the like which smart phone in terms of signal technology is coupled to the motor vehicle, can be automatically moved to the open position or closed position of said tailgate, respectively, prior to or when the electric wheelchair autonomously drives, to the loading position thereof behind the rear of the motor vehicle, or when the electric wheelchair drives from said loading position to a lateral driver's door region of the motor vehicle, respectively.

The mechanical coupling between the electric wheelchair, or the first coupling unit disposed thereon, respectively, and the loading device can be established solely during the respective loading procedure, or also can be maintained during the transportation of the electric wheelchair by the motor vehicle. On account of the latter, the electric wheelchair in the transportation position thereof in the rear loading space can be held securely relative to the motor vehicle. To this end, the mechanical means used for the mechanical coupling can be configured so as to be fail-safe such that said mechanical means maintain the mechanical coupling without the external supply of electrical power to an electrical actuating means that activates the mechanical means, and release the mechanical coupling in the case of the external supply of electrical power to the electrical actuating means.

The loading device according to the disclosure can be readily disposed on the motor vehicle in the context of a retrofit of a motor vehicle. The loading device can in particular be an optional item of equipment of the motor vehicle which is installed in the motor vehicle ex works on request of a customer. No participation by an actuator of the electric wheelchair is required for a loading procedure that can be carried out by the loading system according to the disclosure.

The first coupling unit can have a portion that is disposable on a rear side of the backrest of the electric wheelchair and is fixable in a force-fitting and/or form-fitting manner to the electric wheelchair by way of fixing means of the first coupling unit, for example. Bracket portions that in the cross section are U-shaped can laterally adjoin the portion of the first coupling unit, said bracket portion laterally encompassing the backrest and/or a frame holding said backrest, for example. On account thereof, the first coupling unit can be push-fitted from above, that is to say from a headrest, over the backrest or the frame, respectively, for example. Moreover, a force-fitting fixation of the push-fitted first coupling unit to the electric wheelchair can be performed. The first coupling unit can at least be partially produced from a metal, in particular a light metal, a metal alloy, in particular a steel, a fiber-composite material, or a plastics material.

The second coupling unit of the loading device, on the side thereof that faces the first coupling unit, can have a coupling structure which is configured so as to be complementary to a coupling structure which is disposed on the side of the first coupling unit which side faces the second coupling unit, on account of which a form-fit is establishable between the coupling units that are coupled to one another. On account thereof, a desired alignment of the electric wheelchair relative to the loading device can be reliably ensured during a loading procedure and potentially also during a transportation procedure. The second coupling unit can be configured as an anchor plate, for example. The second coupling unit can at least be partially produced from a metal, in particular a light metal, a metal alloy, in particular a steel, a fiber-composite material, or a plastics material.

The telescopic loading arm can have two or more arm elements that are guided on one another in a linear manner, the mutually relative positions of said arm elements being varied as the loading arm is telescoped, wherein at least one arm element can be configured as a hollow profile. In order for an anti-rotation safeguard to be implemented, the arm elements can have a rectangular, for example square, cross-sectional face. At least one arm element can at least be partially produced from a metal, in particular a light metal, a metal alloy, in particular a steel, a fiber-composite material, or a plastics material. The pivot axis about which the loading arm is pivotably connected to the second coupling unit being free means that the pivot axis can be freely repositioned during a loading procedure as described above. Since the free pivot axis runs so as to be parallel with the locationally-fixed pivot axis that runs transversely to the longitudinal direction of the vehicle, the free pivot axis in each state thereof is also aligned so as to be transverse to the longitudinal direction of the vehicle.

The pivot bearing can be disposed on a loading space floor or on at least one loading space side wall of the loading space and fastened to the motor vehicle. Since the pivot bearing is fastenable to the motor vehicle in a locationally-fixed manner, the pivot axis which is defined by the pivot bearing and about which the loading arm is pivotably connected to the pivot bearing is referred to as a locationally-fixed pivot axis. At least one restoring installation by way of which the loading arm that in a loading procedure, or a transportation procedure, respectively, has been lifted, or repositioned away, respectively, from the loading space floor, is impingeable with a restoring force in the direction of the loading floor space can be disposed on the pivot bearing. It is reliably prevented on account thereof that the loading arm of the non-utilized loading device is lifted from the loading floor and subsequently crashes onto the latter again when the motor vehicle is traveling.

The electric wheelchair has two rear wheels which are drivable by means of a traction motor or by means of in each case one traction motor. The electric wheelchair has a chair body which is supported by the rear wheels and front wheels of the electric wheelchair and which configures a seat having a backrest for a person and which serves for receiving, or holding, respectively, the traction motor, or the traction motors, respectively, and a traction battery. The chair body of the electric wheelchair can be configured so as not to be foldable, or so as to be rigid, respectively.

The motor vehicle is in particular a passenger motor vehicle having a rear loading space which is closable by a tailgate that is configured so as to be at least in one part, wherein the tailgate by means of at least one electric actuator of the motor vehicle is pivotable between the closed position of said tailgate, closing the loading space opening of the loading space, and an open position that releases the loading space opening.

According to one advantageous design embodiment, the second coupling unit has at least one repositionable coupling means which by means of at least one activation unit is transferable from an uncoupling state in which the second coupling unit is incapable of being coupled to the first coupling unit to a coupling state in which the second coupling unit is capable of being coupled to the first coupling unit, and vice versa. In order for the two coupling units to be coupled to one another, said two coupling units are first brought into mutual physical contact, wherein the coupling means is located in the uncoupling state thereof. The coupling means, by means of the, for example electromotive or electromagnetic, activation unit, is subsequently repositioned from the uncoupling state to the coupling state of said coupling means, on account of which a form-fit, for example by an engagement in a portion or behind a portion of the first coupling unit, is established between the coupling units. The coupling means can have, for example, at least one pin, a claw, or the like, which pin is repositionable transversely to the coupling plane between the two coupling units and which in the coupling state of the coupling means engage(s) on the first coupling unit, respectively.

A further advantageous design embodiment provides that the loading arm is pivotably connected to an end portion of the second coupling unit, said end portion in relation to a vertically-aligned coupling position of the second coupling unit being disposed on the floor. On account thereof, the second coupling unit in a state not connected to the first coupling unit can be moved into the rear loading space having the loading arm bearing on the loading space floor, without coming into contact with the motor vehicle. The second coupling unit herein is connected in the manner of a hinge to the loading arm.

According to a further advantageous design embodiment, the pivot bearing has at least two bearing units that are disposable onto mutually opposite end portions of the loading space and fastenable to the motor vehicle, and at least one axle that runs transversely to the longitudinal direction of the vehicle and is mounted on the bearing units, the loading arm being connected to said axle. On account thereof, the loading device can absorb high transverse forces that are aligned in the transverse direction of the vehicle, this being of advantage, for example, in a transportation of the electric wheelchair by way of the motor vehicle when the electric wheelchair herein is to be held in the transportation position of the latter by means of the loading device. The bearing units can be fastened to the loading space floor or to mutually opposite loading space side walls of the loading space. The axle, which is preferably configured so as to be solid, can be mounted so as to be rotatable about the longitudinal central axis thereof, or be fixedly mounted to the bearing units. The loading arm can be connected to the axle by way of at least one radial bearing, or be fixedly connected to the axle. Two encircling collars or shoulders which are mutually spaced apart in the longitudinal direction of the axle can be configured on the axle, the loading arm engaging on the axle between said collars or shoulders. Any movement of the loading arm along the axle is prevented on account thereof. The loading arm can in particular engage centrically on the axle.

According to a further advantageous design embodiment, the loading device has at least one actuator for telescoping the loading arm, said actuator being disposed within the loading arm. No additional installation space is required for the actuator on account thereof, such that the loading space volume of the loading space is restricted to a minor extent. The actuator is supported on two different arm elements of the loading arm so as to be able to carry out a telescoping procedure. The actuator can be configured so as to be electromotive, for example. Alternatively, the actuator can be hydraulic or pneumatic, wherein the actuator can have at least one double-action cylinder.

A further advantageous design embodiment provides that the loading device has at least one actuating unit which is connected to the second coupling unit, on the one hand, and to the loading arm or to a bearing member that is guided so as to be displaceable within the loading arm, on the other hand. The second coupling unit by means of the, for example electromotive, hydraulic, or pneumatic, actuating unit can be pivoted about the free pivot axis relative to the loading arm. When the actuating unit is to be connected directly or immediately, respectively, to the loading arm, the actuating unit should be supported on an arm element of the loading arm which is not repositioned relative to the pivot bearing when the loading arm is telescoping. Alternatively, the actuating unit can be supported on a bearing member or the like, that is displaceably guided in the loading arm or fixed on an arm element, that is not repositioned during the telescoping of the loading arm.

According to a further advantageous design embodiment the loading device is configured so as to be electro-hydraulic. According thereto, the above-mentioned actuator and the above-mentioned actuating unit are configured so as to be hydraulic. The loading device moreover has an installation for supplying the actuator and the actuating unit with a hydraulic fluid, in particular hydraulic oil, said installation having an electrically actuatable hydraulic valve unit for controlling the impingement of the actuator and of the actuating unit with the hydraulic fluid.

According to a further advantageous design embodiment the first coupling unit has at least two elements that are disposed so as to be adjustable relative to one another. On account thereof, the first coupling unit can be adapted to the respective design embodiment of the electric wheelchair such that the loading system can be universally used for electric wheelchairs of various design embodiments. For example, the first coupling unit can be adapted to the respective seat width, or backrest width of an electric wheelchair, respectively. The first coupling unit can moreover have at least one mechanical fixing means for securing the respective relative position between the elements of the first coupling unit.

A further advantageous design embodiment provides that the first coupling unit has at least one electrical signaling unit. The signaling unit can emit, for example, wireless or light signals which can be used for aligning the electric wheelchair relative to the motor vehicle. The loading device and/or the motor vehicle herein can have reception means for receiving the signals emitted by the signaling unit. Should the momentary position of the electric wheelchair relative to the motor vehicle not be identical to an optimal loading position, which can be detected electronically, for example, the loading device, or the motor vehicle, respectively, can emit a correction signal to the electric wheelchair, the electric wheelchair being able to perform a correction of the position thereof upon receiving said correction signal.

According to a further advantageous design embodiment the loading device has at least one actuation electronics system which is specified for actuating the activation unit, the actuator, and the actuating unit in such a manner that the loading arm for loading the electric wheelchair into the loading space is deployed, the second coupling unit simultaneously, in a temporally overlapping manner, or thereafter, is pivoted to the vertical coupling position, the coupling means then is transferred to the coupling state, the second coupling unit then is pivoted in the direction of the loading space, and the loading arm finally is retracted. These steps can be carried out in the reverse order in order for the electric wheelchair to be loaded from the rear loading space.

Further advantageous design embodiments of the disclosure are disclosed in the dependent claims and in the following description of the figures. In the figures:

DETAILED DESCRIPTION

In the different figures, identical parts are always provided with the same reference signs, and so said parts are generally also described only once.

Figure 1:
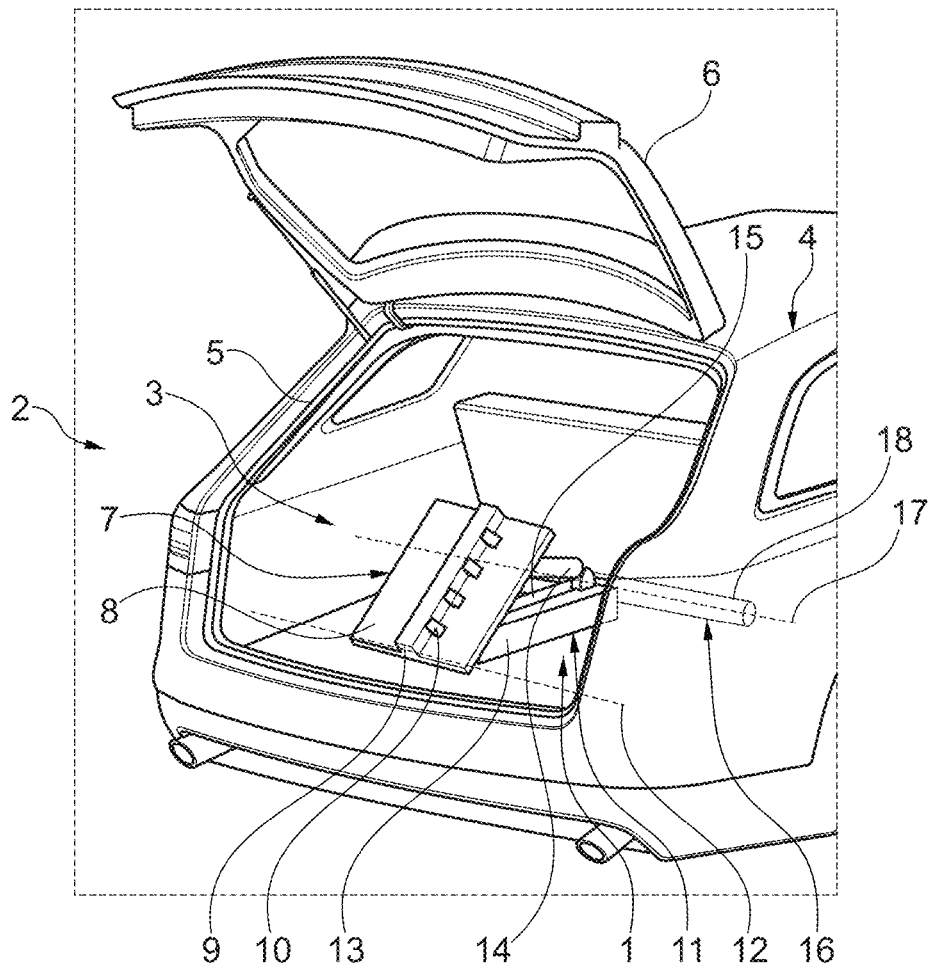
FIG. 1 shows a schematic and perspective illustration of a loading device of an exemplary embodiment for a loading system according to the disclosure, in a passive resting state.

FIG. 1 shows a schematic and perspective illustration of a loading device 1 of an exemplary embodiment for a loading system 2 according to the disclosure for loading an electric wheelchair, shown in the figures, into a rear loading space 3 of a motor vehicle 4, and for loading the electric wheelchair from the loading space 3. The loading device 1 is shown in a passive resting state in which no electric wheelchair is connected to the loading device 1, and in which the loading device 1 is disposed completely within the rear loading space 3.

The motor vehicle 4 is a passenger motor vehicle, the rear loading space 3 thereof having a rear loading space opening 5 and having a tailgate 6 which in a closed position (not shown) closes the loading space opening 5 and in the open position shown releases the loading space opening 5. The tailgate 6 in an exemplary manner is embodied in one part. Of course, the tailgate can also be in multiple parts. The scope of the disclosure also includes tailgates which are laterally hinged so as to be pivotable.

The loading system 2 has a first coupling unit (shown in FIGS. 3 to 6) which is disposable on a rear side of a backrest of the electric wheelchair and is fixable to the electric wheelchair, said first coupling unit is described hereunder in the context of FIGS. 3 to 6. The first coupling unit can have at least two elements (not shown) that are disposed so as to be adjustable relative to one another. Moreover, the first coupling unit can have at least one electrical signaling unit.

The loading device 1 has a second coupling unit 7 which is capable of being coupled to the first coupling unit and is configured as an anchor plate. The second coupling unit 7 has a rectangular main body 8, a protrusion 9 which extends across the length of the main body 8 running centrically on said main body 8. The second coupling unit 7 has four coupling means 10 which are disposed on the protrusion 9 and are repositionable in the width direction of the main body 8 and which are in each case configured in the manner of a claw. The coupling means 10 by way of an activation unit (102) of the second coupling unit 7 are in each case transferable from an uncoupling state (not shown) in which the second coupling unit 7 is incapable of being coupled to the first coupling unit, to the coupling state shown, in which the second coupling unit 7 is capable of being coupled to the first coupling unit, and vice versa.

Figure 2:
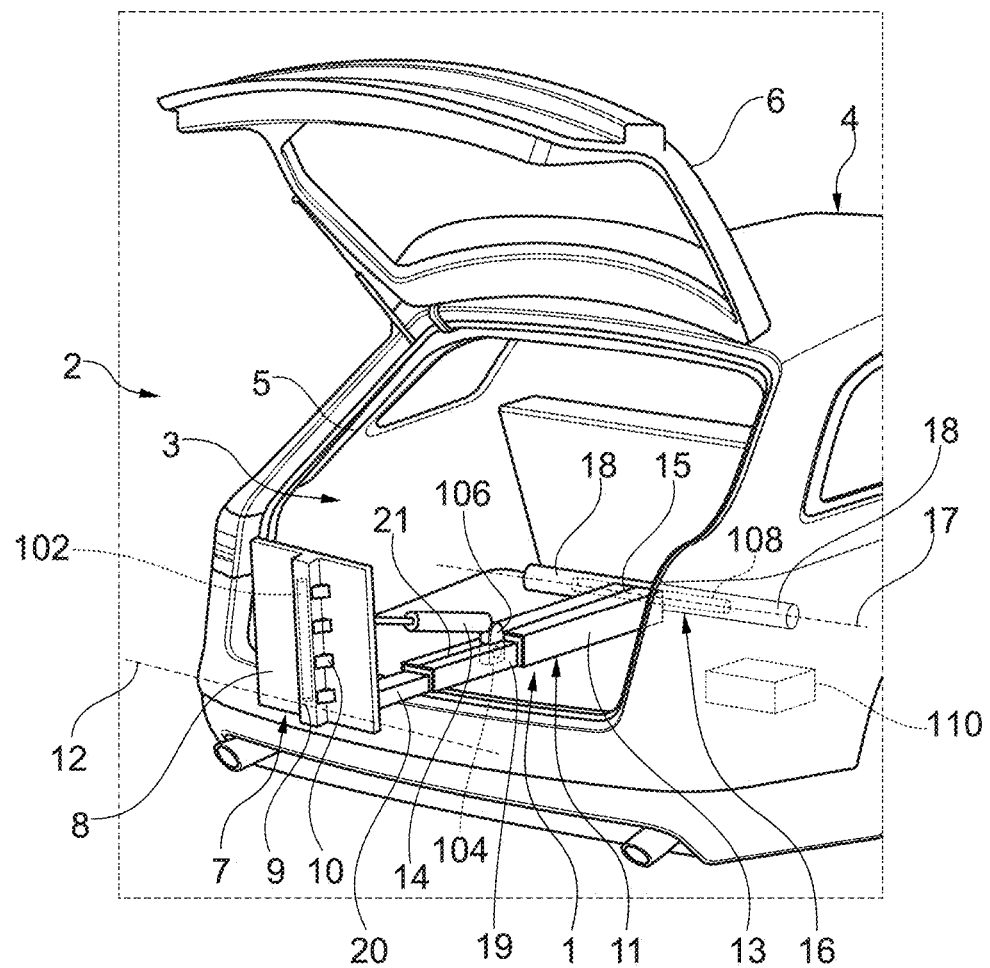
FIG. 2 shows a schematic and perspective illustration of the loading device shown in FIG. 1, in a coupling state.

The loading device 1 furthermore has a telescopic loading arm 11 which by way of an end portion is connected to the second coupling unit 7 so as to be pivotable about a free pivot axis 12. In particular, the loading arm 11 is connected to an end portion of the second coupling unit 7, said end portion in relation to a vertically aligned coupling position of the second coupling unit 7 being disposed on the floor, as is shown in FIG. 2. The loading arm 11 has three arm elements, shown in FIG. 2, having a rectangular cross-section face, said three arm elements being guided in a linear manner so as to be displaceable on one another, of which only the arm element 13 which is not repositioned in a linear manner in the telescoping of the loading arm 11 is shown in FIG. 1.

The loading device 1 moreover has an actuator (104) for telescoping the loading arm 11, said actuator being disposed within the loading arm 11. The loading device 1 furthermore has an actuating unit 14 which is connected to the second coupling unit 7, on the one hand, and to a bearing member (106) that is guided so as to be displaceable within the loading arm 11, on the other hand. A longitudinal slot 15 for connecting the actuating unit 14 to the bearing member is configured on the arm element 13, a connection element (not shown) by way of which the actuating unit 14 is connected to the bearing member running through said longitudinal slot 15.

The loading device 1 has a pivot bearing 16 fastened in an end portion of the loading space 3 on the front side, the loading arm 11 by way of another end portion being connected to said pivot bearing 16 so as to be pivotable about a locationally fixed pivot axis 17 that runs so as to be parallel with and spaced apart from the free pivot axis 12 and so as to be transverse to a longitudinal direction of the vehicle. The pivot bearing 16 has two bearing units 18 (of which only one bearing unit 18 is shown in FIG. 1) that are disposed onto mutually opposite end portions of the loading space 3 and fastened to the motor vehicle, and one axle (108) that runs transversely to the longitudinal direction of the vehicle and is mounted on the bearing units 18, the loading arm 11 being connected to said axle.

The loading device 1 furthermore has one actuation electronics system (110) which is specified for actuating the activation unit, the actuator, and the actuating unit 14 in such a manner that the loading arm 11 for loading the electric wheelchair into the loading space 3 is deployed, the second coupling unit 7 simultaneously, in a temporally overlapping manner, or thereafter, is pivoted to the vertical coupling position shown in FIG. 2, the coupling means 10 then are transferred to the coupling state thereof, the second coupling unit 7 then is pivoted in the direction of the loading space 3, and the loading arm 11 finally is retracted.

FIG. 2 shows a schematic and perspective illustration of the loading device 1 shown in FIG. 1, in a coupling state. To this end, the loading arm 11 has been fully deployed. Simultaneously, in a temporally overlapping manner, or subsequently, the second coupling unit 7 has been pivoted about the free pivot axis 12 to the vertical coupling position of said second coupling unit 7. The three arm parts 13, 19 and 20 of the loading arm 11 are shown, wherein a longitudinal slot 21 for connecting the actuating unit 14 to the bearing member (not shown) within the loading arm 11 is also configured on the central arm part 19.

Figure 3:
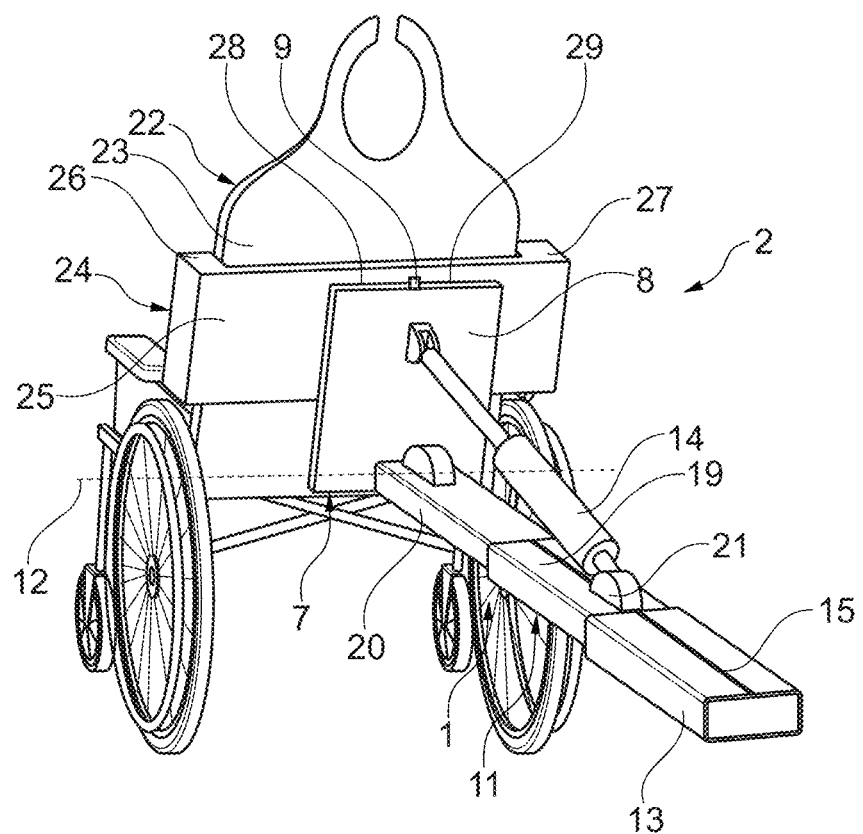
FIG. 3 shows a schematic and perspective illustration of the loading system shown in FIGS. 1 and 2, in a first loading state.

FIG. 3 shows a schematic and perspective illustration of the loading system 2 shown in FIGS. 1 and 2, in a first loading state. The loading device 1 is in the coupling state shown in FIG. 2. An electric wheelchair 22 is moreover illustrated obliquely from behind. The first coupling unit 24 to which the second coupling unit 7 of the loading device 1 is coupled is disposed on a backrest 23 of the electric wheelchair 22.

The first coupling unit 24 has a portion 25 that is disposed on the rear side of the backrest 23 that faces the observer, and has two bracket portions 26 and 27 that are configured so as to be U-shaped and laterally adjoin the portion 25. The bracket portions 26 and 27 encompass in each case laterally one peripheral portion of the backrest 23.

Two protrusions 28 and 29 which in the cross section are L-shaped are disposed on the side of the portion 25 that faces the second coupling unit 7, a spacing which corresponds approximately to the width of the protrusion 9 on the second coupling unit 7 being disposed between said protrusions 28 and 29, such that the protrusion 9 can be fit between the protrusions 28 and 29 in a form-fitting manner. Undercuts are configured on account of the L-shaped design embodiment of the protrusions 28 and 29. The coupling means 10 (not shown in FIG. 3) of the second coupling unit 7 engage in one of these undercuts when the coupling means 10 are in the coupling states thereof. On account thereof, the two coupling means 7 and 24 are mechanically coupled to one another. The actuating unit 14 is articulated on the second coupling unit 7 and on the bearing member (not shown) that is disposed in the loading arm 11, or is connected in an articulated manner to the second coupling unit 7 and to the bearing member, respectively.

Figure 4:
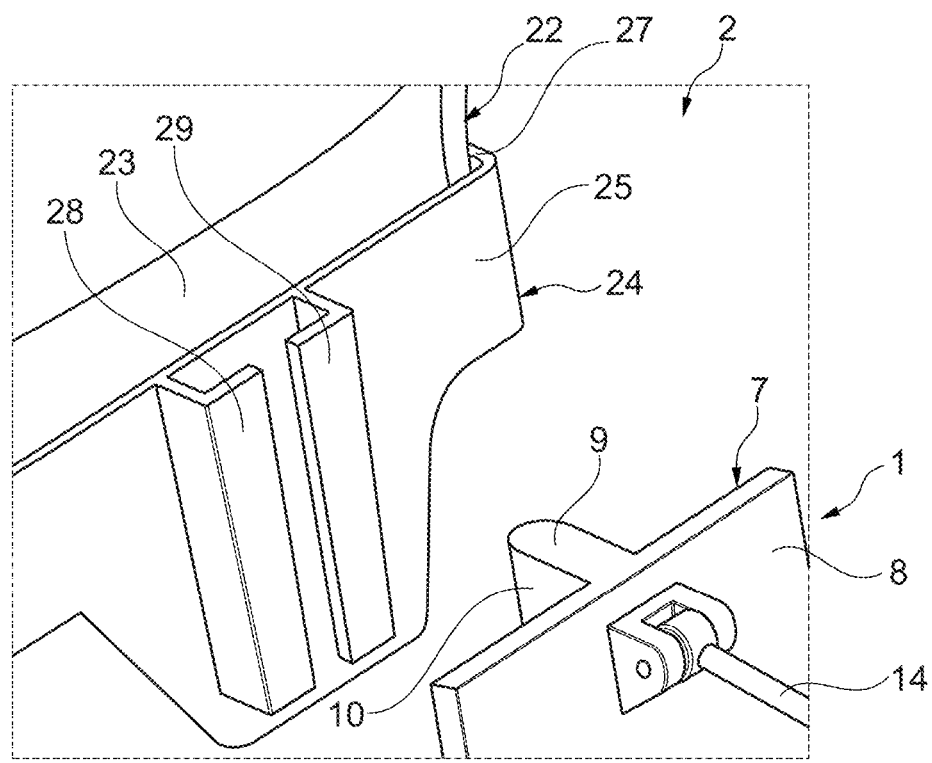
FIG. 4 shows a schematic illustration of details of the loading system shown in FIG. 3.

FIG. 4 shows a schematic illustration of details of the loading system 2 shown in FIG. 3. The first coupling unit 24 can be seen. The L-shaped design embodiment of the protrusions 28 and 29 can be seen in particular. It can moreover be seen how the first coupling unit 24 laterally encompasses the backrest 23 of the electric wheelchair 22.

Figure 5:
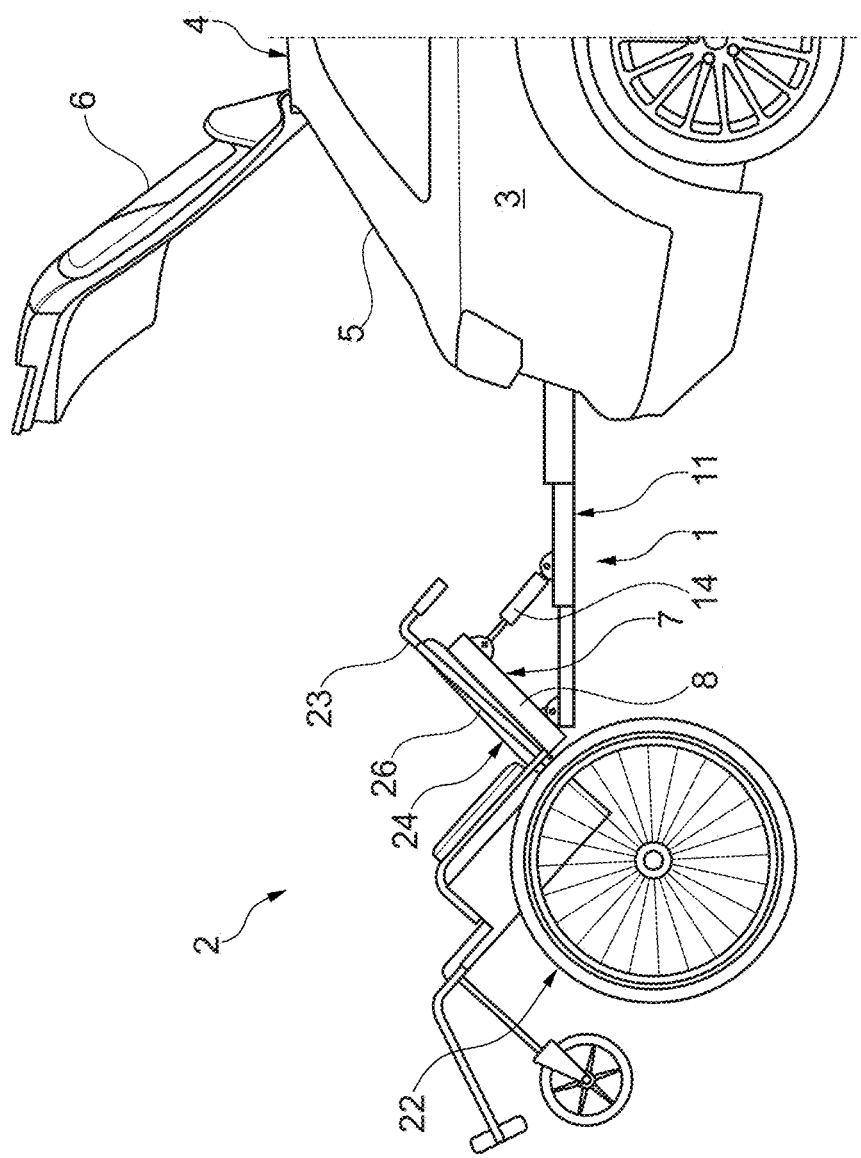
FIG. 5 shows a schematic illustration of the loading system shown in FIGS. 1 and 2, in a second loading state.

FIG. 5 shows a schematic illustration of the loading device 2 shown in FIGS. 1 and 2, in a second loading state. This loading state emanates from the loading state shown in FIG. 3 in that the second coupling unit 7 by means of the actuating unit 14 has been pivoted in the direction of the loading space 3, on account of which the electric wheelchair 22 has been lifted.

Figure 6:
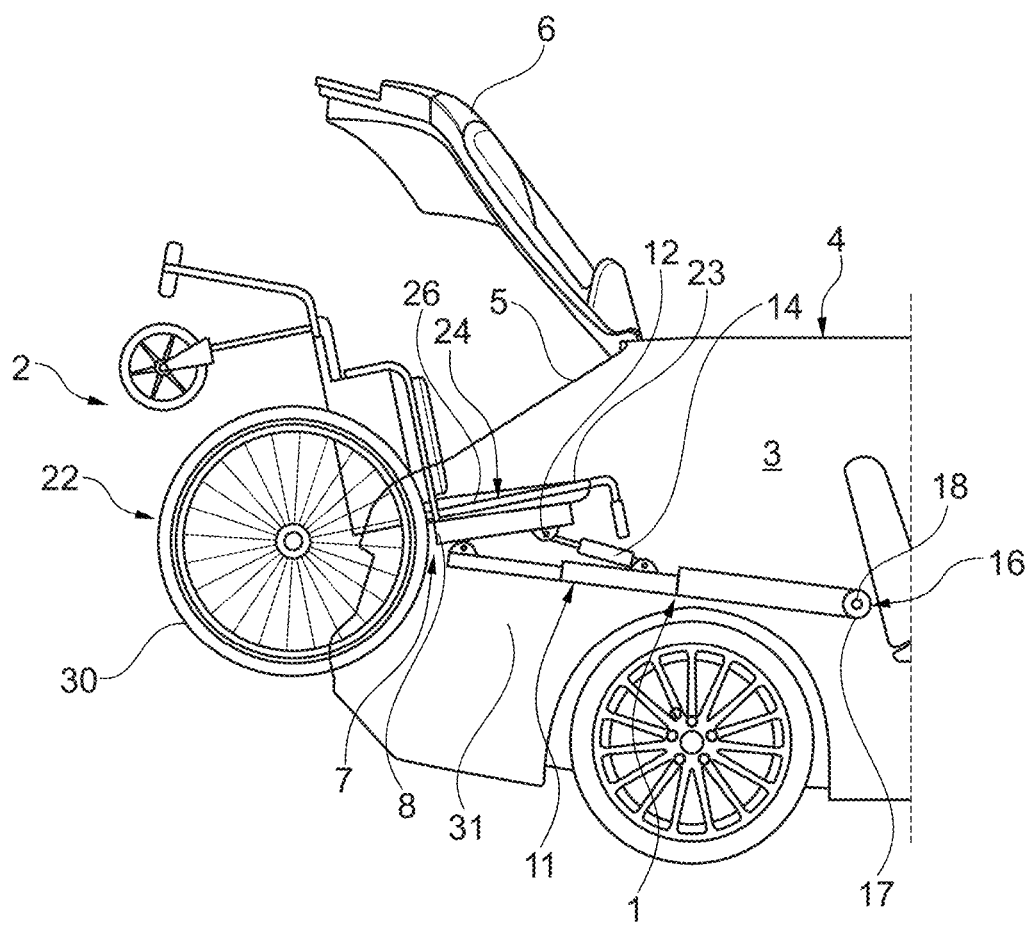
FIG. 6 shows a schematic illustration of the loading system shown in FIGS. 1 and 2, in a third loading state.

FIG. 6 shows a schematic illustration of the loading system 2 shown in FIGS. 1 and 2, in a third loading state. This loading state emanates from the loading state shown in FIG. 5 in that the second coupling unit 7 by means of the actuating unit 14 has been pivoted further in the direction of the loading space 3 and in that the loading arm 11 has been partially retracted such that rear wheels 30 of the electric wheelchair 22 have rolled along a portion of the motor vehicle 4 that adjoins the loading space opening 5 on the floor, on account of which the loading arm 11 has been lifted, or has been pivoted about the locationally-fixed pivot axis 17 away from a loading space floor 31. The loading arm 11 is retraced further in order for the electric wheelchair 22 to be moved to the transportation position thereof that is completely disposed within the loading space 3.

Figure 7:
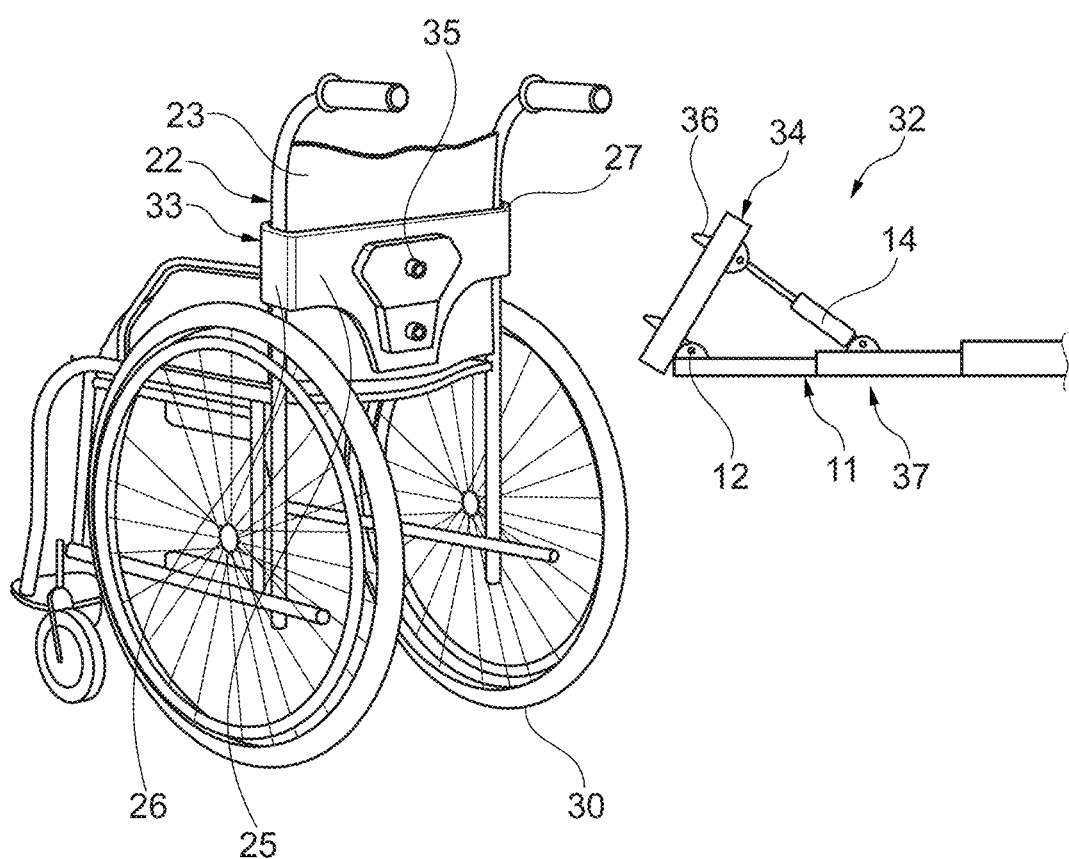
FIG. 7 shows a schematic and perspective illustration of a further exemplary embodiment for a loading system according to the disclosure.

FIG. 7 shows a schematic and perspective illustration of a further exemplary embodiment for a loading system 32 according to the disclosure. The loading system 32 differs from the exemplary embodiment shown in FIGS. 1 to 6 solely by the coupling mechanism between the two coupling units 33 and 34. The first coupling unit 33 comprises two coupling receptacles 35 which are disposed vertically on top of one another, into which coupling means 36 that are disposed on the second coupling unit 34 of the loading device 37 and that are activatable are introducible, said coupling means 36 being capable of being spread open or mutually repositionable in a reciprocating manner. To avoid repetitions, reference is made in other respects to the above description pertaining to FIGS. 1 to 6.

What is claimed is:

1. A loading system for loading a wheelchair into a rear loading space of a vehicle and for loading the wheelchair from the loading space, comprising:
    at least one first coupling unit disposed on a rear side of a backrest of the wheelchair and fixable to the wheelchair; and
    at least one loading device disposed on the vehicle, including
        at least one second coupling unit configured to couple to the first coupling unit,
        at least one telescopic loading arm disposed in a longitudinal direction of the vehicle and, by way of an end portion, is connected to the second coupling unit to pivot about a free pivot axis in a transverse direction of the vehicle, and
        at least one pivot bearing configured to fasten to a front side end portion of the loading space, by way of which the loading arm is connected to pivot about a locationally-fixed pivot axis that runs parallel with the free pivot axis in the transverse direction and longitudinally spaced apart from the free pivot axis; and
        an actuating unit connected to the loading coupling unit at a first end, and to the loading arm via a bearing member that is guided so as to be displaceable within the loading arm at a second end,
        wherein a travel direction of the vehicle defines the longitudinal direction,
        wherein the telescopic loading arm disposed includes:
            a rear arm element connected to the end portion of a loading coupling unit to pivot about the free pivot axis,
            a front arm element having a first slot and connected to the pivot bearing, and
            a middle arm element retractably connected between the rear arm element and the front arm element, the middle arm element having a second slot overlapping with the first slot,
            wherein the bearing member is configured to slide through the first slot and second slot.

2. The loading system as claimed in claim 1, wherein the loading arm is connected to pivot to an end portion of the second coupling unit, the end portion in relation to a vertically-aligned coupling position of the second coupling unit disposed on a floor of the vehicle.

3. The loading system as claimed in claim 1, wherein the pivot bearing has at least two bearing units that are disposable onto mutually opposite end portions of the loading space and fastenable to the vehicle, and at least one axle that runs transversely to the longitudinal direction of the vehicle and is mounted on the bearing units, the loading arm being connected to the axle.

4. The loading system as claimed in claim 1, wherein the loading device has at least one actuator for telescoping the loading arm, the actuator being disposed within the loading arm.

5. The loading system as claimed in claim 1, wherein the loading device has at least one actuation electronics system which is configured to actuate the at least one activation unit, the actuator, and the actuating unit in such a manner that the loading arm for loading the electric wheelchair into the loading space is deployed, the second coupling unit simultaneously, in a temporally-overlapping manner, or thereafter, is pivoted to a vertical coupling position, the second coupling unit then is transferred to a coupling state in which the second coupling unit is capable of being coupled to the first coupling unit, the second coupling unit then is pivoted in the direction of the loading space, and the loading arm finally is retracted.

6. The loading system as claimed in claim 1, wherein the loading device is configured to be electro-hydraulic.

7. A wheelchair loading system for a vehicle, comprising:
a loading coupling unit configured to couple to a backrest of a wheelchair;
a telescopic loading arm disposed in a longitudinal direction of the vehicle, and connected to an end portion of a loading coupling unit to pivot about a free pivot axis in a transverse direction of the vehicle;
a pivot bearing fastened to a front side of a vehicle loading space connected to the loading arm to pivot about a locationally-fixed pivot axis parallel with the free pivot axis in the transverse direction, and longitudinally spaced apart from the free pivot axis; and
an actuating unit connected to the loading coupling unit at a first end, and to the loading arm via a bearing member that is guided so as to be displaceable within the loading arm at a second end,
wherein a travel direction of the vehicle defines the longitudinal direction,
wherein the telescopic loading arm disposed includes:
 a rear arm element connected to the end portion of a loading coupling unit to pivot about the free pivot axis,
 a front arm element having a first slot and connected to the pivot bearing, and
 a middle arm element retractably connected between the rear arm element and the front arm element, the middle arm element having a second slot overlapping with the first slot,
 wherein the bearing member is configured to slide through the first slot and second slot.

8. The system as claimed in claim 7, further comprising a wheelchair coupling unit disposed on a rear side of a backrest of the wheelchair and fixable to the wheelchair, configured to couple to the loading coupling unit.

9. The system as claimed in claim 8, further comprising an activation unit configured to:
 transfer from an uncoupling state in which the loading coupling unit is incapable of being coupled to the wheelchair coupling unit to a coupling state in which the loading coupling unit is capable of being coupled to the wheelchair coupling unit; and
 transfer from the coupling state in which the loading coupling unit is capable of being coupled to the wheelchair coupling unit to the uncoupling state in which the loading coupling unit is incapable of being coupled to the wheelchair coupling unit.

10. The system as claimed in claim 7, wherein the pivot bearing comprises at least two bearing units that are disposable onto mutually opposite end portions of the loading space and fastenable to the vehicle, and at least one axle that runs transversely to the longitudinal direction of the vehicle and is mounted on the bearing units, the loading arm being connected to the axle.

11. The system as claimed in claim 7, wherein the loading system comprises at least one actuator for telescoping the loading arm, the actuator being disposed within the loading arm.

12. The system as claimed in claim 7, wherein the loading system comprises is configured to be electro-hydraulic.

13. The system as claimed in claim 7, wherein the loading coupling unit comprises at least two elements disposed to be adjustable relative to one another.

14. The system as claimed in claim 7, wherein the loading coupling unit comprises at least one electrical signaling unit.

* * * * *